United States Patent
Riccardella et al.

(10) Patent No.: US 9,281,085 B2
(45) Date of Patent: Mar. 8, 2016

(54) METHOD OF PROVIDING AND EVALUATING A MID-WALL REPAIR

(75) Inventors: Peter Charles Riccardella, Denver, CO (US); Pedro Ernesto Amador, Lawrenceville, GA (US)

(73) Assignee: AZZ WSI LLC, Norcross, GA (US)

( * ) Notice: Subject to any disclaimer, the term of this patent is extended or adjusted under 35 U.S.C. 154(b) by 1261 days.

(21) Appl. No.: 11/091,767

(22) Filed: Mar. 29, 2005

(65) Prior Publication Data

US 2008/0008287 A1    Jan. 10, 2008

(51) Int. Cl.
*G21C 13/036*    (2006.01)
*G21C 17/017*    (2006.01)

(52) U.S. Cl.
CPC ............ *G21C 13/036* (2013.01); *G21C 17/017* (2013.01); *G21Y 2002/202* (2013.01); *G21Y 2002/204* (2013.01); *G21Y 2002/402* (2013.01); *G21Y 2004/40* (2013.01); *G21Y 2004/504* (2013.01); *Y02E 30/40* (2013.01); *Y10T 29/49737* (2015.01)

(58) Field of Classification Search
CPC ............ G21C 13/036; G21C 17/017; G21Y 2004/40; G21Y 2004/504; G21Y 2002/202; G21Y 2002/204; G21Y 2002/402; Y02E 30/40

USPC ............ 29/402.02, 402.08, 402.09, 402.11, 29/402.13, 723, 890.031, 890.053, 29/890.054, 464, 705, 281.1
See application file for complete search history.

(56) References Cited

U.S. PATENT DOCUMENTS

| | | | | |
|---|---|---|---|---|
| 4,624,402 A | * | 11/1986 | Pitcairn et al. | 228/119 |
| 4,694,549 A | * | 9/1987 | Rabe | 29/890.031 |
| 5,202,082 A | * | 4/1993 | Brown et al. | 376/260 |
| 6,684,706 B2 | * | 2/2004 | Knight et al. | 73/623 |
| 6,834,092 B2 | * | 12/2004 | Willis et al. | 376/260 |
| 7,206,372 B2 | * | 4/2007 | Willis et al. | 376/260 |
| 2005/0199591 A1 | * | 9/2005 | Coe et al. | 219/76.1 |
| 2005/0220250 A1 | * | 10/2005 | Payne et al. | 376/204 |

* cited by examiner

*Primary Examiner* — Christopher M Koehler
(74) *Attorney, Agent, or Firm* — Greenberg Traurig LLP

(57) ABSTRACT

A method of repairing a connection between a first nozzle and a closed vessel includes cutting through an entire thickness of the first nozzle at a location adjacent to the mid-wall of the vessel. A portion of the first nozzle is removed. A replacement nozzle is disposed in a void formed by removal of the portion of the first nozzle. A weld is formed between the replacement nozzle and a surface of the mid-wall of the vessel.

14 Claims, 5 Drawing Sheets

METHOD OF PROVIDING AND EVALUATING A MID-WALL REPAIR

BACKGROUND OF THE INVENTION

1. Field of the Invention

The present invention is directed to a method of providing a mid-wall repair, as well as a method of evaluating the mid-wall repair.

2. Discussion of the Related Art

In pressurized water (PWR) and boiling water (BWR) nuclear reactors, multiple penetrations are provided in a pressure vessel or piping. The penetrations consist of sleeves and/or nozzles that extend from the exterior of the pressure vessel through openings in a low alloy or carbon steel vessel wall and a nickel-chromium-iron (Ni—Cr—Fe) or stainless steel clad disposed on the interior surface of the pressure vessel. During initial fabrication (i.e., before access to the interior of the pressure vessel is limited, and before the pressure vessel is subjected to radiation and pressurized high temperature water as a result of operation of the nuclear reactor), a J-shaped groove is formed in the vessel interior clad and in some cases the low alloy steel or carbon steel vessel interior wall as well, and a weld material is deposited in the groove to weld the nozzle to the clad and vessel wall, where applicable. Thus, the nozzle is welded from the interior of the pressure vessel to connect the nozzle to the pressure vessel.

As a result of operating and residual stresses in the J-groove weld and the primary water environment during operation, the welds, the sleeves or nozzles, and the Ni—Cr—Fe or stainless steel cladding are subject to stress corrosion cracking. Thus, it becomes necessary to repair the connection between the nozzle and the pressure vessel.

In a known repair technique, the technician does not have access to the highly radioactive interior of the closed pressure vessel. Thus, repair of the connection between the pressure vessel and the nozzle is conducted from the exterior of the pressure vessel.

In the known repair technique, the nozzle is severed at the mid-wall of the pressure vessel and a sacrificial plug installed to create a flush surface at the exterior of the pressure vessel. A welding pad of a material that is not susceptible to stress corrosion cracking, such as Alloy 52, is formed on the exterior of the pressure vessel. A hole is drilled in the welding pad, and a replacement nozzle formed of a material that is not susceptible to stress corrosion cracking, such as Alloy 690, is disposed in the hole. The replacement nozzle is then welded to the welding pad. Because it is not practical to provide postweld heat treatment stress relief of the weld and the adjacent areas, a temper bead welding technique is used to weld the welding pad to the pressure vessel or piping.

The known repair technique suffers from a number of disadvantages, however. These disadvantages include that it is often difficult to precisely align the replacement nozzle with the openings in the pressure vessel wall and the new welding pad on the pressure vessel. Further, a relatively large amount of material is used to provide the welding pad of sufficient size (e.g., 6 inch by 6 inch by 0.5 inch) to permit testing and evaluation of the weld pad to the pressure vessel. Further, because formation of the temper bead must be precisely controlled, the weld pad requires a relatively large amount of time to produce, which may increase down time of the nuclear reactor and the amount of radiation to which the technician is exposed during the repair process. The severity of these problems is compounded by the fact that a typical pressure vessel includes multiple nozzles.

SUMMARY OF THE INVENTION

The present invention provides a method of repairing a connection between a first nozzle and a closed vessel. An entire thickness of the first nozzle is cut through at a location adjacent to the mid-wall of the vessel. A portion of the first nozzle is removed. A replacement nozzle is disposed in a void formed by removal of the portion of the first nozzle. A weld is formed between the replacement nozzle and a surface at the mid-wall of the vessel.

The present invention further provides a method of repairing and inspecting a first nozzle penetrating a closed vessel, including removing a portion of the first nozzle, forming a weld between a replacement nozzle and a surface of the mid-wall of the vessel, and evaluating the integrity of the weld at the mid-wall of the vessel.

The present invention still further provides a closed vessel. A mid-wall is disposed between an interior wall and an exterior wall of the vessel. A first nozzle extends from a first portion of the mid-wall to the interior of the vessel. A second nozzle extends from a second portion of the mid-wall to the exterior of the vessel. A weld is disposed between the second portion of the mid-wall and the second nozzle.

BRIEF DESCRIPTION OF THE DRAWINGS

An appreciation of the present invention, and many of the attendant advantages of the invention, can be readily ascertained and/or obtained as the same becomes better understood by reference to the following detailed description when considered in connection with the accompanying drawings, wherein.

DETAILED DESCRIPTION

Figure 1:
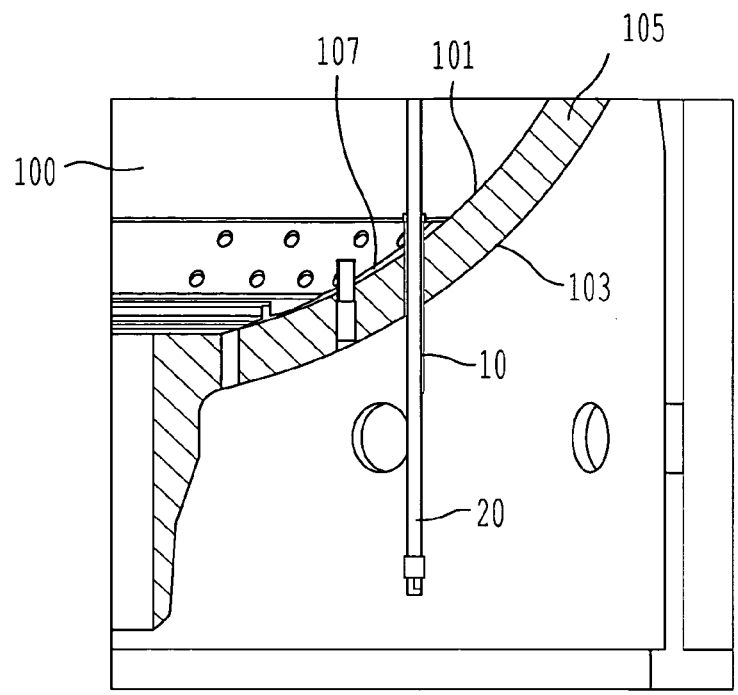
FIGS. 1-10 are detail views showing a method of providing and evaluating a mid-wall repair according to the present invention.

Examples of one or more embodiments of the present invention are described with reference to the drawings, wherein like reference numbers throughout the several views identify like or similar elements.

The method of providing and evaluating a mid-wall repair, as shown in the drawings and as described herein, can be provided between a pressure vessel or piping 100 (referred to as pressure vessel in the following discussion) of a PWR or BWR nuclear reactor and at least one nozzle 10. It is to be understood, however, that the method can be applied to various structures, including various nuclear reactor structures as well as structures that are not disposed in a nuclear reactor.

As shown in FIG. 1, the pressure vessel 100 can include an interior surface 101 opposite an exterior surface 103, and a mid-wall 105 extending between the interior and exterior surfaces 101 and 103. The interior and exterior surfaces 101 and 103 can be curved or contoured, and the mid-wall 105 can be of a constant thickness, at least in the position through which the nozzle 10 is disposed. A clad material 107 can be disposed on the interior surface 101. In a preferred embodiment, materials of the mid-wall 105 and the clad 107 can include steel, and more preferably can include a low alloy or carbon steel and an Ni—Cr—Fe or stainless steel material, respectively.

As discussed above, the pressure vessel 100 can include at least one nozzle 10. In a preferred embodiment, the pressure vessel 100 can include a plurality of nozzles 10. It is to be understood, however, that the pressure vessel 100 can include any number of nozzles 10.

Figure 2:
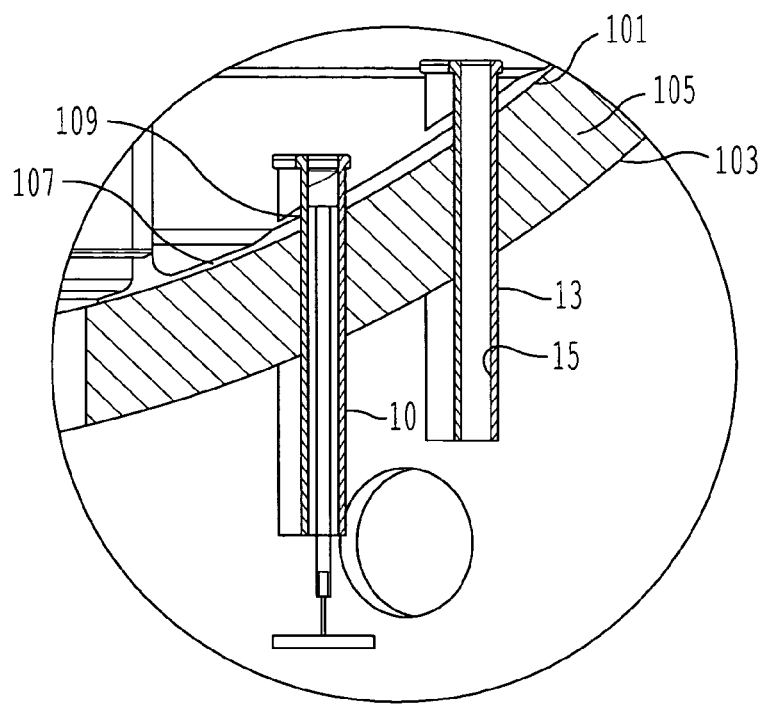

As shown in FIG. 2 and FIG. 1, the nozzle 10 can be in the form of a sleeve or nozzle having an exterior surface 13 opposite an interior surface 15, and a heater or other component 20 disposed within an interior defined by the interior surface 15 of the nozzle 10. In a preferred embodiment, a material of the nozzle 10 can include an Alloy 600 or stainless steel material.

A weld 109 can be used to connect the pressure vessel 100 and the nozzle 10. In a preferred embodiment, a groove can be formed in the clad 107 or a combination of the clad and vessel wall with weld butter. More preferably, the clad 107 or combination of clad and vessel wall can include a J-shaped groove. The weld 109 can be formed in the groove to weld the pressure vessel 100 to the nozzle 10. It is to be understood, however, that various welds can be used to weld the pressure vessel 100 to the nozzle 10.

As shown in FIG. 2, during an initial stage of the mid-wall repair process, a length of the nozzle 10 on an exterior side of the pressure vessel 100 can be removed. In a preferred embodiment, the nozzle 10 can be cut by an abrasive cutting operation commencing on the exterior surface 13 of the nozzle 10. It is to be understood that the various material and component removal processes, including abrasive grinding and cutting, can be performed manually (i.e., by hand or with hand tools) or remotely (i.e., by automatic tools or processes, including those in use or those that are later developed). As shown in FIG. 2, the heater or other component 20 can then be removed from the interior of the nozzle 10, decontaminated, and otherwise repaired or replaced, depending on its condition.

Figure 3:
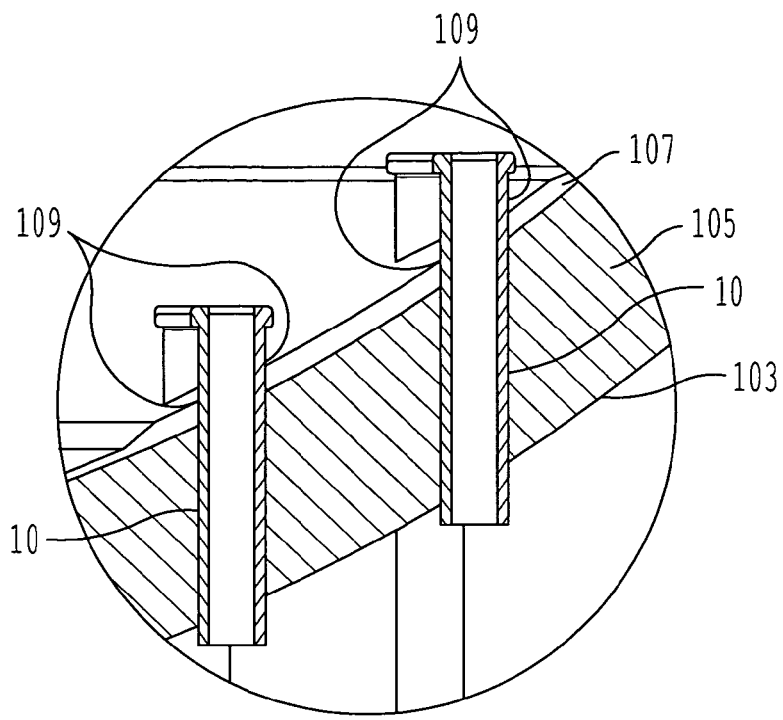

As shown in FIG. 3, the length of the nozzle 10 extending from the exterior surface 103 of the pressure vessel 100 can be further reduced. Returning to FIG. 2, a spacer barrier can be disposed within a portion of the nozzle 10 extending above the clad 107 in the interior of the pressure vessel 100 prior to the further reduction of the length. This spacer barrier is a foreign materials exclusion (FME) device to prevent intrusion of foreign materials from the subsequent repair operations into the interior of the vessel. In a preferred embodiment, an abrasive cutting operation commencing on the exterior surface 13 of the nozzle 10 can be used to further reduce the length of the nozzle 10. Preferably, the length of the nozzle is reduced to a predetermined length as close as practical to the curved exterior surface 103 of the pressure vessel 100.

Figure 4:
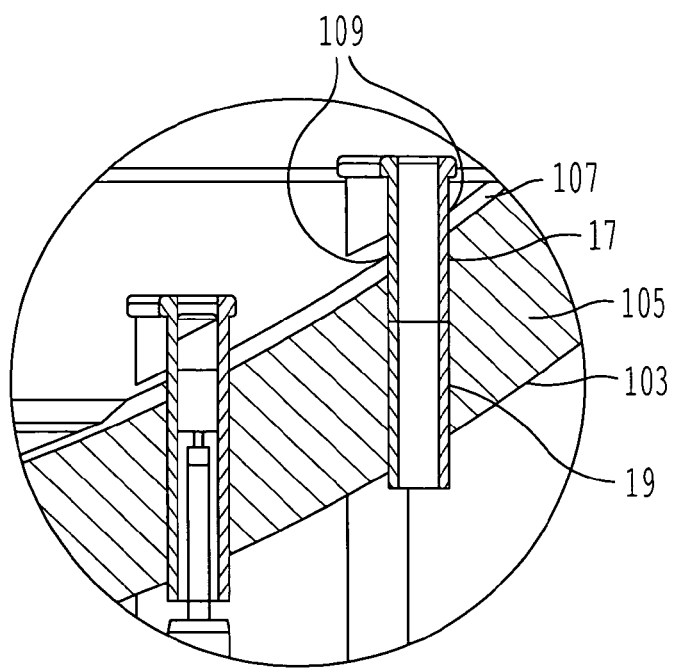

As shown in FIG. 4, the nozzle 10 can be severed at a position adjacent the mid-wall 105 of the pressure vessel 100 (i.e., between the interior and exterior surfaces 101 and 103) to provide an upper nozzle portion 17, which is welded to the pressure vessel 100 by the weld 109, and a lower nozzle portion 19, which is no longer connected to the pressure vessel 100. In a preferred embodiment, the nozzle 10 can be severed by an abrasive cutting operation commencing on the interior surface 15 of the nozzle 10. In the preferred embodiment, the nozzle 10 can be severed at a predetermined distance from the bottom of the nozzle 10 that maximizes the lower nozzle portion 19 that will subsequently be removed.

Figure 5:
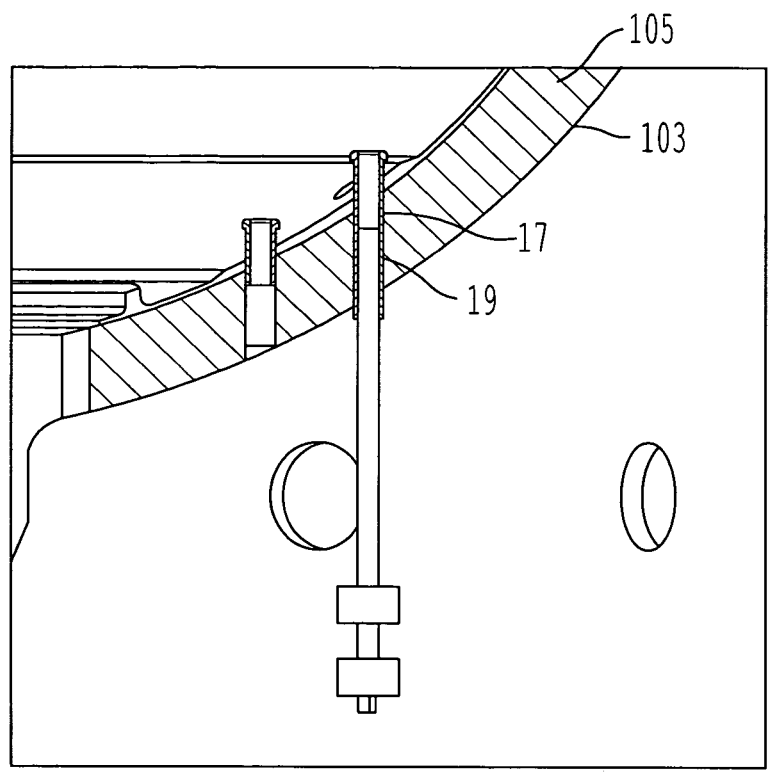

As shown in FIG. 5, the lower nozzle portion 19 can be removed from the pressure vessel 100. In a preferred embodiment, the lower nozzle portion 19 can be removed manually. The lower nozzle portion 19 can be removed from the pressure vessel 100 with a slide hammer or other means if it cannot be removed manually.

Figure 6:
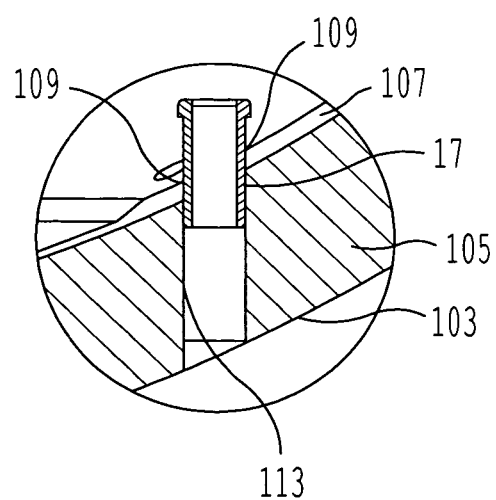

As shown in FIG. 6, the upper nozzle portion 17 can remain welded to the pressure vessel 100, and the FME device can be removed from the upper nozzle portion 17. The upper nozzle portion 17, as well as a portion of the mid-wall 105 exposed by removal of the lower nozzle portion 19 and defining a mid-wall void 113, can be treated, cleaned, or otherwise prepared for subsequent attachment of a replacement nozzle and insertion of a heater or other implement after cleaning the upper nozzle portion 17. In a preferred embodiment, scale or other sediment can be removed from the upper nozzle portion 17, and a surface of the mid-wall void 113 can be cleaned by an abrasive operation. More preferably, an abrasive grinding wheel can be used to clean the upper nozzle portion 17 and the surface of the mid-wall void 113. When access can be permitted to the upper nozzle portion 17 from the interior of the pressure vessel 100, a cap (not shown) can be disposed to cover the upper nozzle portion 17, such that scale or other sediment removed from the upper nozzle portion 17 or the mid-wall void 113 is prevented from contaminating the pressure vessel 100.

After cleaning the upper nozzle portion 17 and the mid-wall void 113, the surface of the mid-wall void 113 can be evaluated after dye penetrant testing, to confirm that the surface of the mid-wall void 113, such as a portion of the surface adjacent the upper nozzle portion 17, is acceptable for subsequent installation of the replacement nozzle, as described below.

Figure 7:
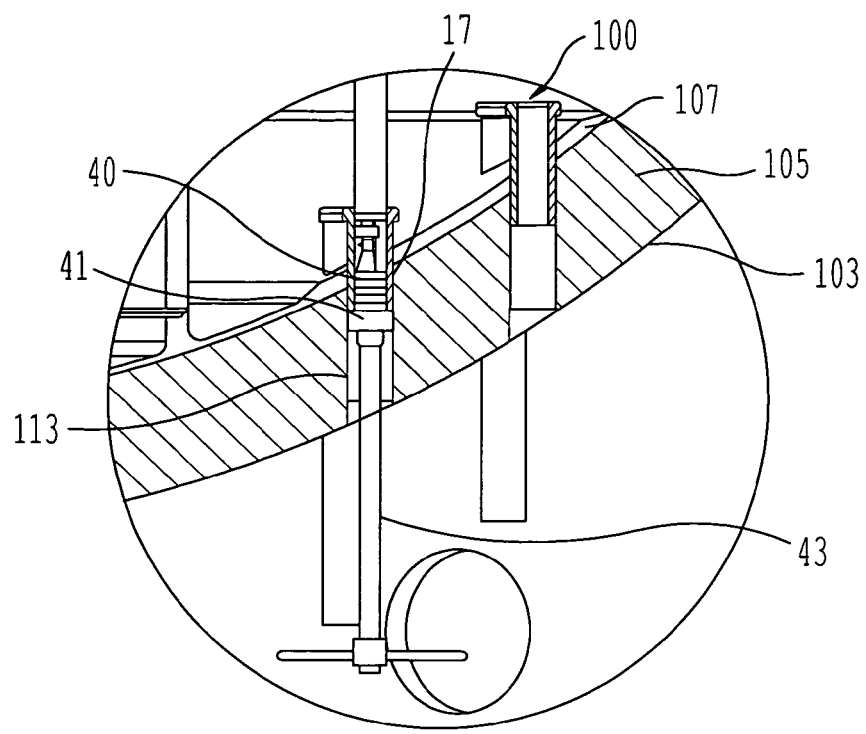

As shown in FIG. 7, an alignment tool 40 can be disposed in the upper nozzle 17 to facilitate alignment and attachment of a replacement nozzle 30 with the pressure vessel 100. The installation tool 43 can include a head portion 41 having an outer diameter corresponding to a diameter of the mid-wall void 113, and having a flat surface configured to contact an end surface of the upper nozzle portion 17. By this arrangement, the installation tool 43 can axially locate the alignment tool in the upper nozzle 17 and the self-centering feature of the alignment tool locates it radially relative the upper nozzle 17 with a high degree of precision.

In an embodiment of the invention, the alignment tool 40 can include a sealing portion that seals against an interior surface of the upper nozzle portion 17. Such an alignment tool 40 can permit reactor fuel off-load or refueling while the mid-wall repair is occurring, by permitting the pressure vessel 100 to be filled with water during the repair process of up to the removal of the alignment tool 40 and reinsertion of the heater or instrument.

Figure 8:
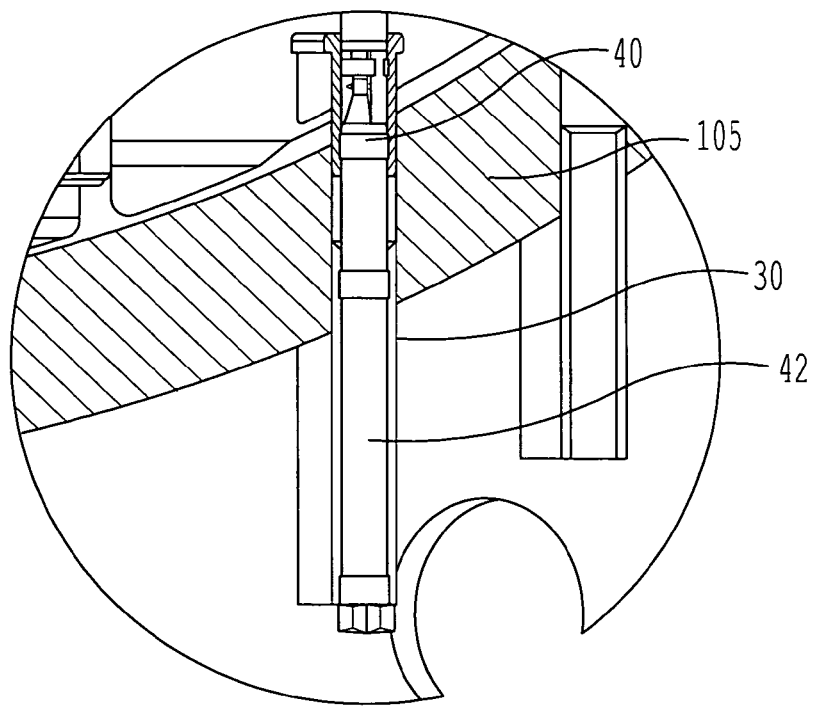

As shown in FIG. 8, the replacement nozzle 30 can be disposed on an alignment shaft 42 piloted in the alignment tool 40, and can be precisely axially and radially located as described above. In a preferred embodiment, the material of the replacement nozzle 30 can be determined so as to resist stress corrosion cracking when the replacement nozzle 30 is welded to the mid-wall 105, and more preferably a material of the replacement nozzle 30 can include Alloy 690 or stainless steel.

Figure 9:
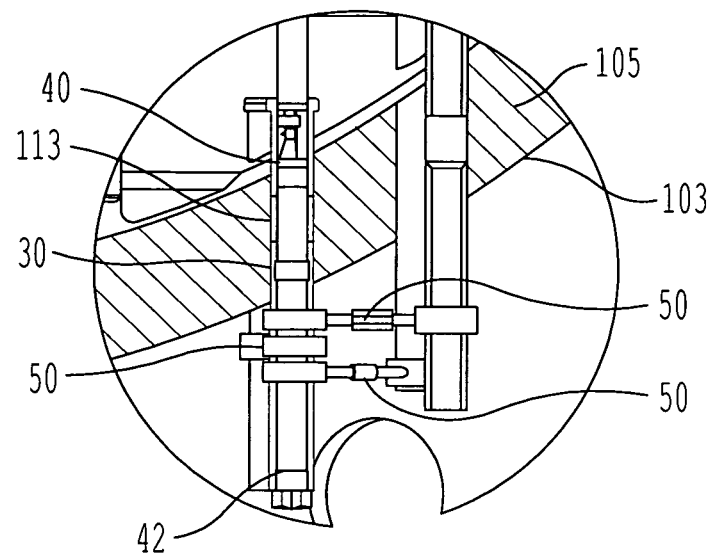

As shown in FIG. 9, at least one clamping device 50 can be used to maintain the precise axial and radial position of the replacement nozzle 30 in the mid-wall void 113. The clamping device 50 can include an end portion configured to retain the replacement nozzle 30, and can include an opposite end portion configured to retain another one of the nozzles 10 or other available attachment point(s). By this arrangement, it is understood that the replacement nozzle 30 can be maintained at a desired position relative to other nozzles welded to the pressure vessel 100 or some other desired alignment. In a preferred embodiment, a plurality of clamping devices 50 are used to maintain the position of the replacement nozzle 30, and more preferably at least three clamping devices 50 are used.

The alignment tool 40 and alignment shaft 42 can be removed from the upper nozzle 17 and the replacement nozzle 30, such that the clamping device maintains the position of the replacement nozzle 30 relative to the pressure vessel 100.

Figure 10:
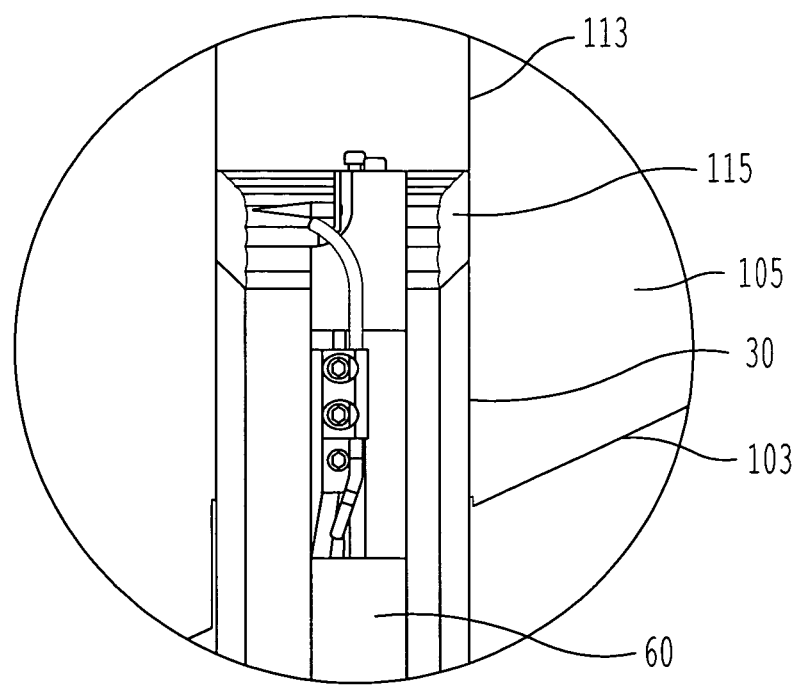

As shown in FIG. 10, the replacement nozzle 30 can be welded to the mid-wall 105 of the pressure vessel 100, and more specifically a weld 115 having at least three weld layers can be formed between the surface of the mid-wall void 113 and the replacement nozzle 30. In a preferred embodiment, the weld 115 can include a plurality of weld layers each having a predetermined deposit height, and more preferably can include at least three weld layers with a total predetermined deposit height of at least 0.125 inches, and the overall buildup of the weld 115 can be determined such that the weld 115 extends only minimally beyond an inner diameter of the replacement nozzle 30.

A welding tool 60 can be used to provide the weld 115 between the replacement nozzle 30 and the mid-wall 105. The welding tool 60 can include a video camera such that a technician can monitor formation of the weld 115, a wire feed through which the technician can deliver a material for the weld 115, an inert gas delivery system to aid in formation of the weld 115, and a water cooling system for cooling the welding tool 60.

A surface of the weld 115 can be prepared for subsequent testing and evaluation. After formation of the weld 115, the weld surface can be prepared for subsequent testing and evaluation. An abrasive grinding operation can be used to remove an excess portion of the weld 115 (e.g., a portion of the weld extending beyond the inner diameter of the replacement nozzle 30).

The weld 115 can be inspected to determine the sufficiency of the weld 115. In a preferred embodiment, the weld 115 can be liquid penetrant inspected.

In a preferred embodiment, the weld 115 can be ultrasonically inspected. More preferably, an ultrasonic map indicating properties of the weld 115 can be provided, the map including characteristics of portions of the weld 115 such as echodynamic signature including response amplitude and time of flight of the ultrasonic signal. By comparing the ultrasonic map of the weld 115 with a plurality of ultrasonic maps of known defect-free and defective welds, a technician can determine whether the weld 115 is substantially free of defects. The ultrasonic maps of known defect-free and defective welds can be determined by producing ultrasonic maps of various weld samples, and then by destructively evaluating the weld samples to determine the absence or existence of defects. It is understood that the term "defect-free" can include welds that meet or exceed the UT examination standards set forth in ASME Code, Section III, and specifically Paragraph NB-5330, which is hereby incorporated by reference. This is in contrast to the more forgiving UT examination requirements of ASME Code, Section XI, which is invoked for this repair by ASME Code Case N-638, which are also both hereby incorporated by reference. It is also to be understood that the above-described process can be performed to provide a weld that exceeds ASME Code, Section XI requirements.

Numerous additional modifications and variations of the present invention are possible in light of the above teachings. It is therefore to be understood that within the scope of the appended claims, the present invention may be practiced otherwise than as specifically described herein.

The invention claimed is:

1. A method of repairing a connection between a first nozzle and a closed vessel, comprising:
   cutting through an entire thickness of the first nozzle at a location adjacent to a mid-wall of the vessel;
   completely removing from the mid-wall of the vessel a portion of the first nozzle;
   disposing a replacement nozzle in an opening that remains after removal of the portion of the first nozzle, wherein the replacement nozzle and the removed portion of the first nozzle are different pieces;
   welding at least a portion of the replacement nozzle to at least a portion of a surface of the mid-wall of the vessel; and
   positioning the replacement nozzle vertically and horizontally in the opening, wherein positioning comprises: disposing a positioning tool in the opening prior to disposing the replacement nozzle in the opening; disposing the replacement nozzle on the positioning tool to axially and radially position the replacement nozzle; fixing the axial and radial positions of the replacement nozzle; and removing the positioning tool prior to welding at least the portion of the replacement nozzle, wherein fixing comprises fixing the axial and radial positions of the replacement nozzle with at least one clamping tool, wherein the clamping tool has an end portion clamped to the replacement nozzle at a location on the replacement nozzle that is disposed external to the mid wall and an opposite end portion clamped to another vessel nozzle at a location on the vessel nozzle that is also disposed external to the mid wall.

2. The method according to claim 1, wherein welding comprises forming a plurality of weld layers between the replacement nozzle and the surface of the mid-wall.

3. The method according to claim 2, wherein welding comprises forming at least three weld layers.

4. The method according to claim 3, wherein welding comprises forming the weld to have a total thickness about equal to the total thickness of the replacement nozzle.

5. The method according to claim 2, further comprising: evaluating the integrity of the weld.

6. The method according to claim 5, wherein evaluating comprises: liquid penetrant testing of the weld.

7. The method according to claim 5, wherein evaluating comprises: ultrasonically inspecting the weld; and comparing a result of the ultrasonic inspection to a plurality of results obtained from inspecting defective and defect-free welds.

8. The method according to claim 7, wherein ultrasonically inspecting comprises analyzing at least one of an echodynamic signature including response amplitude and time of flight of the ultrasonic signal.

9. The method according to claim 1, further comprising: reducing a total length of the first nozzle.

10. The method according to claim 1, further comprising: removing a component disposed within the first nozzle.

11. The method according to claim 10, wherein removing comprises removing a heater or other component disposed within the first nozzle.

12. The method according to claim 1, where fixing comprises fixing the positions of the replacement nozzle with three clamping tools.

13. The method according to claim 12, further comprising:
   preparing at least one of the portion of the first nozzle that remains with the vessel and the surface of the mid-wall of the vessel after removing the portion of the first nozzle and before disposing the replacement nozzle in the opening; and
   dye penetrant testing the surface of the mid-wall after preparing and before disposing the replacement nozzle in the opening.

14. A method of repairing a connection between a first nozzle and a closed vessel, comprising:

cutting through an entire thickness of the first nozzle at a location adjacent to a mid-wall of the vessel;

completely removing from the mid-wall of the vessel a portion of the first nozzle;

disposing a replacement nozzle in an opening that remains after removal of the portion of the first nozzle, wherein the replacement nozzle and the removed portion of the first nozzle are different pieces;

welding at least a portion of the replacement nozzle to at least a portion of a surface of the mid-wall of the vessel; and positioning the replacement nozzle vertically and horizontally in the opening, wherein positioning comprises: disposing a positioning tool in the opening prior to disposing the replacement nozzle in the opening; disposing the replacement nozzle on the positioning tool to axially and radially position the replacement nozzle; fixing the axial and radial positions of the replacement nozzle; and removing the positioning tool prior to welding at least the portion of the replacement nozzle, wherein fixing comprises fixing the axial and radial positions of the replacement nozzle with at least one clamping tool, wherein the welding is performed without the use of a welding pad.

* * * * *